United States Patent [19]

Pallini, Jr. et al.

[11] Patent Number: 4,711,471
[45] Date of Patent: Dec. 8, 1987

[54] NON-CLOCKING CONNECTOR WITH LOCKING ANTI-ROTATION TABS

[75] Inventors: Joseph W. Pallini, Jr.; Lionel J. Milberger, both of Houston, Tex.

[73] Assignee: Vetco Gray Inc., Houston, Tex.

[21] Appl. No.: 841,655

[22] Filed: Mar. 20, 1986

[51] Int. Cl.⁴ .............................................. F16L 55/00
[52] U.S. Cl. ....................................... 285/81; 285/305
[58] Field of Search ....................... 285/92, 81, 80, 305

[56] References Cited

U.S. PATENT DOCUMENTS

| | | | |
|---|---|---|---|
| 2,936,184 | 5/1960 | Epstein | 285/81 |
| 3,066,959 | 12/1962 | White | 285/81 |

FOREIGN PATENT DOCUMENTS

| | | | |
|---|---|---|---|
| 99293 | 1/1984 | European Pat. Off. | 285/92 |
| 569250 | 5/1945 | United Kingdom | 285/81 |

Primary Examiner—Richard J. Scanlan, Jr.
Attorney, Agent, or Firm—Joseph R. Dwyer

[57] ABSTRACT

A method and tool for a cutting locking tab 56 of a selected configuration on a joint (a pin (12a) and box (16a) threaded together). The pin has longitudinal slot(s) 24a and the box (16a) has inner and outer peripheral grooves (44,46) forming shear lines (50) to enhance the shearing to form the locking tab (56).

The essential feature is the elimination of clocking, i.e., a predetermination of the relative orientation of the box and pin during manufacture.

9 Claims, 14 Drawing Figures

NON-CLOCKING CONNECTOR WITH LOCKING ANTI-ROTATION TABS

BACKGROUND OF THE INVENTION

This invention relates to connectors for large diameter tubular members and is particularly directed to a method and apparatus for locking the connectors in their fully made-up (fully joined) condition.

Large diameter pipes (16 to 36 inch OD or the like) are used in lengths about 40 feet long for casing and risers in offshore drilling and production operations. To connect these lengths of pipe as a string of pipes, easily made-up, leak-tight connectors that will not become disconnected are desirable.

Prior Art

Conventionally there is a threaded box at one end and a threaded pin at the other end of each pipe length to make up a string of casing or risers and to prevent disconnection, i.e., unthreading, at the joints, several approaches are used; one such anti-rotation locking mechanism is illustrated by way of example in FIG. 1 of the drawings. There is shown a large diameter pipe 10 with a weld-on pin or male member 12 with frustoconical threads 14 threadable into a box or female member 16 having internal mating frustoconical threads (not shown). The box 16 is also connected to a pipe 20 by welding. As shown in this figure, the pin 12 has a rib 22 at the base of the threads 14 and a plurality of longitudinal pin slots 24 formed in the rib and part of wall of the body of the pin (only one being shown and described) which cooperate with a peripherally oriented through-slot 26 on the lower (outboard) edge of the box 16. When the joint is fully made up, the through-slot 26 on the box 16 will align with the pin slot 24. The box may be marked as at 30 to facilitate this alignment. Then the area 32 of the box below the through-slot 26 (i.e., the outboard side of the box), adjacent edge 34a of the pin slot 24, is sheared, forming a tab which engages slot edge 34a, thereby locking the connector and preventing unthreading. The slot edge 34a acted as cutting edge as the end of the tab was formed.

One of the problems with the prior art anti-rotating locking mechanism is that the final position of the through-slots 26 on the box 16, relative to the pin slots 24, when made-up, had to be determined at the time of manufacture. This meant that each pin and box had to be gaged so that the position of the box relative to the pin could be determined with a threaded gage. Once determined, the gage had to be disconnected and the through-slots 26 were machined in the box 16. This procedure, known as clocking, was expensive, time-consuming, and increased the cost of the manufacture of these connectors. Too, since so much depended upon the accuracy of alignment of these slots, any error could have costly, time-consuming effect in field operations. In addition, the variation in the length of the tabs due to clocking tolerances creates some variation in the torque resistance of the tabs.

It is therefore an object of this invention to provide a new and improved anti-rotation locking mechanism for connectors which requires no clocking, thereby reducing manufacturing cost, improving rejection rates, and reducing time and alleviating any potential misalignment problems that may occur in the field, as well as provide a more consistent tab. It is also desirable to maintain the radius of the ends of the tab to avoid high stress concentrations.

SUMMARY OF THE INVENTION

The invention which accomplishes the foregoing object comprises providing longitudinal slot(s) in the pin of a connector and forming peripheral groove(s), both inside and out on the walls of the box of the connector, such that when the joint is made up (pin and box threaded together), a cutting tool, juxtapositioned the pin slot and the outside groove, will shear an area of the wall of the box in a particular configuration forming locking tabs, thereby locking the connector against disconnection.

Also disclosed is a cutting tool with a shear face for shearing the box edge in a selected manner to provide the anti-rotation locking means.

DETAILED DESCRIPTION

As mentioned above, FIG. 1 represents the prior art anti-rotation locking mechanism for locking a threaded connector to prevent decoupling (unthreading).

Figure 1:
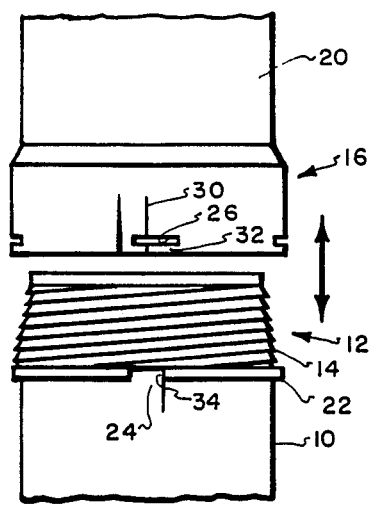
FIG. 1 illustrates the prior art anti-rotation locking means on a typical pin and box connector as mentioned in the Background, above.
Figure 2:
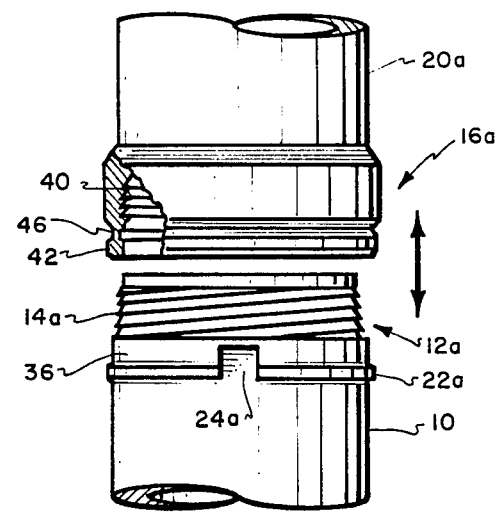
FIG. 2 illustrates a pin and box connector with the box modified in accordance with the teachings of this invention.

FIG. 2 illustrates a connector similar to that shown in the prior art of FIG. 1 but modified in accordance with the teachings of this invention to provide an anti-rotation lock means which does not require clocking. In the further description herein, where possible, the components described in FIG. 1 and having the same function in the remaining figures, will be given the same reference numeral except with a suffix "a".

As shown, a pin 12a is welded onto a pipe 10a and is provided with frustoconical threads 14a with a rib 22a located near the base of the threads. In this embodiment, however, the rib 22a spaced slightly below the base of the threads 14a, i.e., separated by a guide surface 36. The rim 22a of the pin 12a is provided with a pin slot 24a formed by any suitable means, as by milling, in a longitudinal direction. In this figure, only one such pin slot is shown but any number may be selected. Conventionally, an even number from two to eight of such pin slots are provided.

The box 16a is welded onto a pipe 20a and is provided with internal threads 40 to mate and thread onto the frustoconical threads 14a of the pin 12a. The threads 40 are numbered as such only because they were not shown in FIG. 1, although the same type of threads 14a and 40 may be the same as in the prior art.

Figure 10:
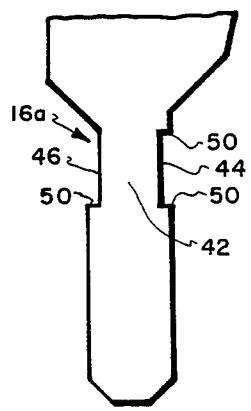
FIG. 10 is a schematic illustration of a cross-section of the inner and outer walls of the box.

As shown in this figure and more clearly in FIG. 10, the lower or outboard portion 42 of the box 16a is thinner and the box is formed with an internal groove 44 at its inner wall and an external groove 46 on its outer wall. Each groove is formed circumferentially of the box 16a and is defined by sharp edges 50 forming 90° shear planes for the cutting tool to be described.

Figure 3:
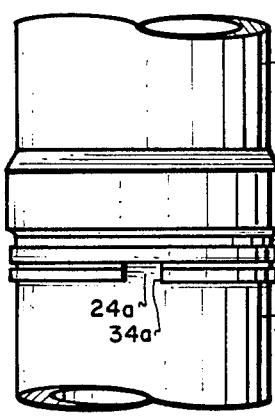
FIG. 3 illustrates a fully made-up connector prior to shearing the box to complete the anti-rotation locking means.
Figure 4:
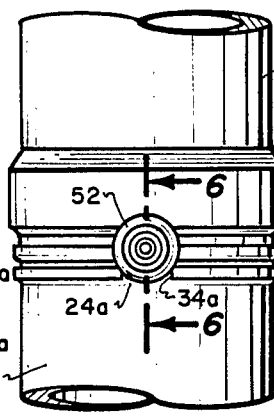
FIG. 4 illustrates the impact tool being positioned adjacent the joint to shear the edge of the box and complete the anti-rotation locking means.
Figure 5:
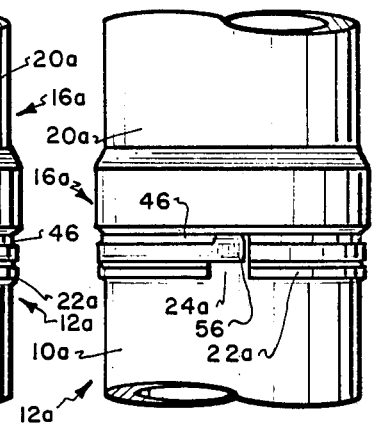
FIG. 5 illustrates the box having been sheared and locked against rotation relative to the pin in the decoupling direction.

FIGS. 3, 4, and 5, respectively, show the connector completely made up with the internal and external grooves 44 and 46 overlapping the major portion of the pin slot 24a; FIG. 4 illustrating the positioning of impact tool 52: and FIG. 5 showing the formation of tab 56 forming anti-rotation locking means of this invention. This tab 56 engages an edge 34a in the pin slot 24a and is more clearly shown in FIG. 14. This tab 56 is of a particular configuration and how it is formed and the tool used to form it will now be described.

Figure 6:
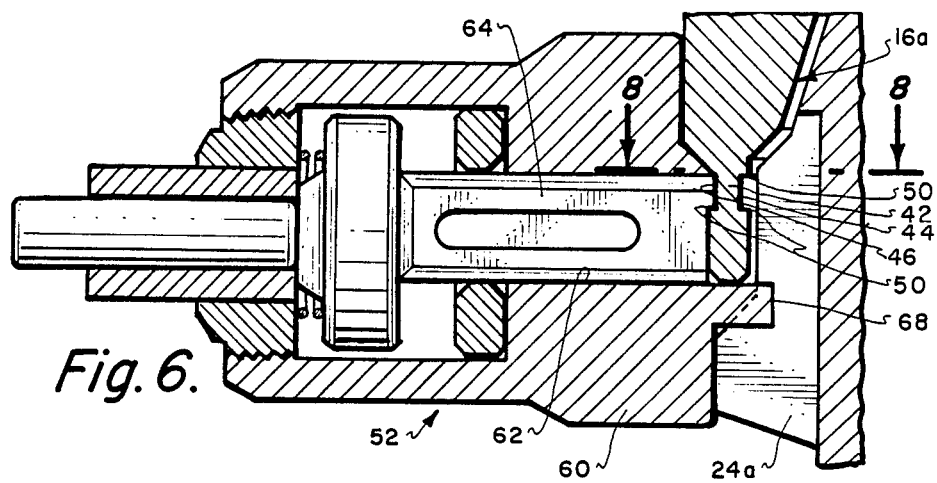
FIG. 6 is an enlarged view of that shown in FIG. 4, taken along line 6—6 of FIG. 4 and showing the impact tool positioned in the pin slot and against the outer edge of the box before shearing.

Thus, as shown in FIG. 6, the cutting tool 52 comprises a housing 60 having an internal chamber 62 for a hammer 64 which is slidable therein. This hammer 64 is moved axially of the housing 60 in any suitable manner, preferably by an air or hydraulic power source, and this movement is represented by an arrow 66 in FIG. 7. The details of the connection of the power source to the hammer form no part of this invention and will not be described further.

Figure 7:
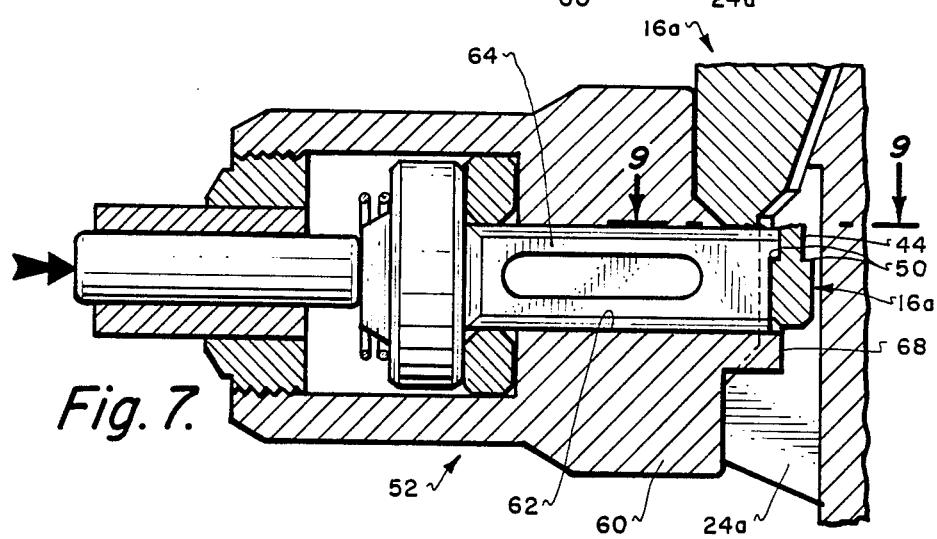
FIG. 7 is similar to FIG. 6 except showing that the impact tool housing sheared a part of the box radially inwardly into the pin slot to form the anti-rotation locking means.

To align the cutting tool 52 with the box 16a, the housing 60, and as more clearly shown in FIGS. 6, 7 12 and 13, has a circumferential alignment blade 68 wide enough to span the width of the slot 24a. This serves to orient the housing 60 horizontally. The housing 60 is also provided with a pair of axial alignment probes 70 and 72 which engage the outer groove on the box. This orients the tool 52 vertically and when the cutting tool is placed as shown in FIG. 6 and 7, the tab 56 is formed by activation of the hammer moving and shearing the selected portion of the box into the pin slot in a special manner.

Figures 8, 9:
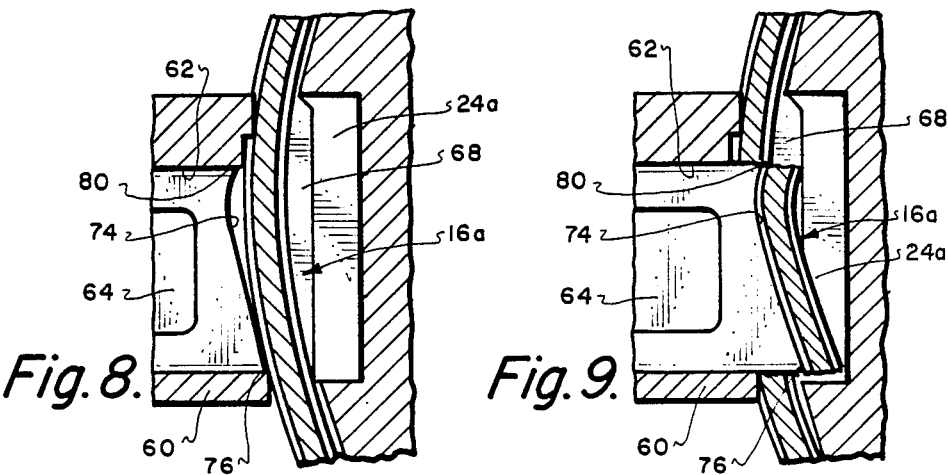
FIG. 8 is another view of the impact tool against the outer surface of the box before shearing, taken along 8—8 of FIG. 6.
FIG. 9 illustrates the impact tool having bent and sheared the outer periphery of the box into the pin slot
Figure 11:
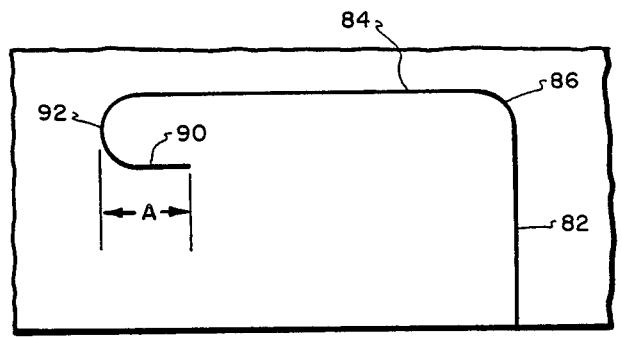
FIG. 11 is a schematic illustration of the cut made by the cutting tool on the outer wall of the box.
Figure 12:
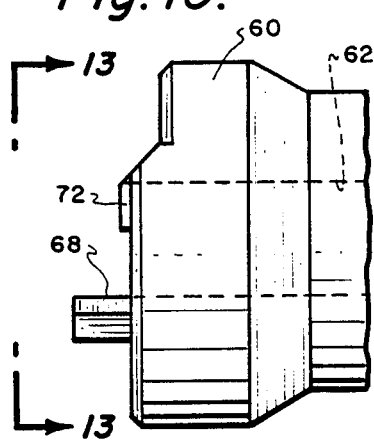
FIG. 12 is a side view of the housing for the cutting tool.
Figure 13:
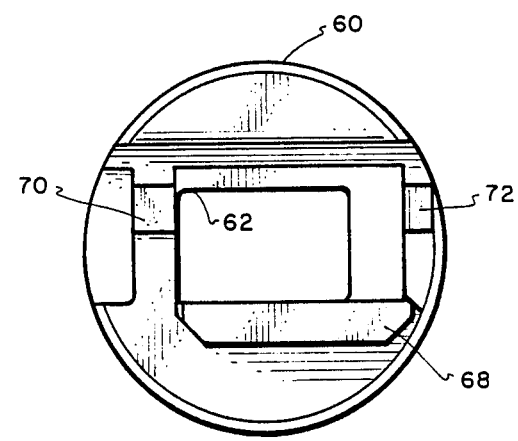
FIG. 13 is a frontal view of the housing for this cutting tool.

FIGS. 8, 9 and 11, taken together, show the hamer 64 is provided with a front face 74 which, in the horizontal view, has a first cutting edge 76, which upon energization of the hammer 64, will shear the box 16a and move the sheared material into the groove 24a, while the opposite or second cutting edge 80 will shear the box 16a and only partially bend the material of the box into the groove 24a. The first cutting edge 76 moves the sheared material a greater distance into the groove 24a with a progressively less bend being made as the shear meets the edge 80.

Figure 14:
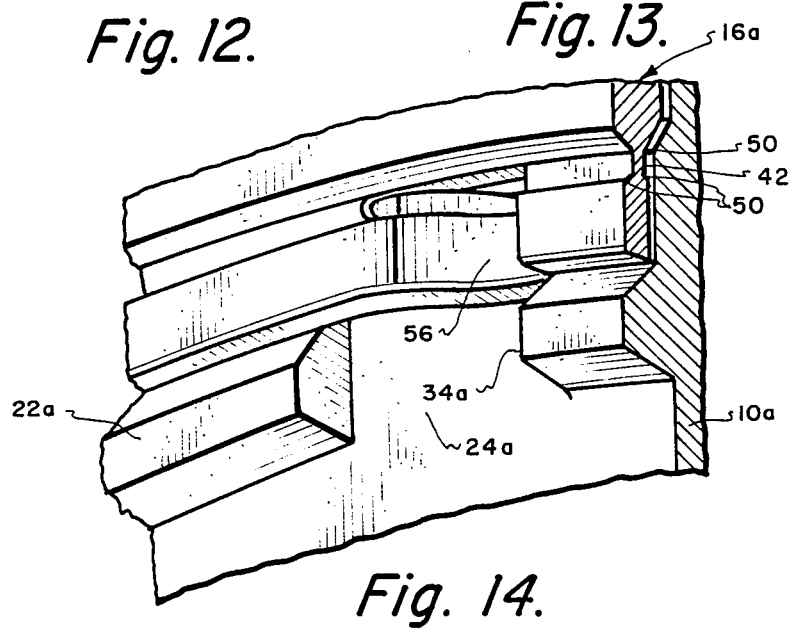
FIG. 14 is a perspective view of the completed, finally formed anti-rotational locking means.

The special configuration of the cutting tool front face is more clearly shown on the outer side wall of the box in the illustration of FIG. 11 and FIG. 14.

FIG. 11 illustrates a right edge 82, sheared by the first edge 76, a horizontal line 84 joined by a curved corner 86 sheared by the horizontal edge of the front face 74 terminating in a reverse section 90 joined by a semi-circular cut 92 sheared by the second edge 80. The radius of the corner 86 and semicircular cut 92 prevents high stress concentration that might induce cracking and the length of the reverse section 90 determines or controls bending of the tab as shown by arrow A and more clearly shown in FIG. 14.

We claim:

1. In a connector comprising a box with internal threads and a pin with external threads adapted to be threaded together to form a joint, the improvement comprising,
   an external peripheral groove on the outside of the box below the threads, said outside being otherwise a uniform uninterrupted surface until a locking tab is formed thereon,
   an internal groove on the inside of the box below the threads in the area of the external groove, said internal and external grooves thereby thinning the wall of the box and forming peripheral shear lines,
   a pin with at least one longitudinal slot thereon, such that when the connector is made up, the thinned wall of the box overlaps the longitudinal slot on the pin,
   a locking tab formed on said box by bending the thin wall radially inwardly into the longitudinal slot and shearing the thinned wall pheripherally at said peripheral shear lines in a shear pattern whereby the locking tab engages the longitudinal slot to lock the box and pin together against relative rotation.

2. The connector as claimed in claim 1 wherein said shear pattern includes a first vertical shear line, a first horizontal shear line connected to said first vertical shear line, a second horizontal shear line spaced from said first horizontal shear line and a third shear line connected to said first and second shear lines.

3. The connector as claimed in claim 2 wherein the shear pattern is bent progressively from the third shear line to the first vertical shear line.

4. The connector as claimed in claim 3 wherein the depth of the bend of said shear lines varies progressively more from the third shear line to the first vertical shear line.

5. The connector as claimed in claim 4 wherein said shear line is curved to avoid stress concentrations as the locking tab is formed that would otherwise occur but for the curvature.

6. In a connector comprising a box having a first selected side wall thickness with internal threads in said side wall and a pin with external threads adapted to be threaded together to form a joint, the improvement comprising,
   an external peripheral groove on the outside surface of the side wall the box below the internal threads, said outside being otherwise a uniform uninterrupted surface until a locking tab is formed thereon,
   an internal groove spaced from the open end and on the inside wall of the box below the internal threads in the area of the external groove thereby thinning the side wall of the box below the internal threads and forming a second side wall thickness adjacent the open end of the box and also forming parallel peripheral shear lines, a pin with at least one longitudinal slot thereon, such that when the connector is made up, the thinned wall of the box overlaps the longitudinal slot on the pin, and a locking tab formed at said thinned wall in a shear pattern by bending said thinned wall inwardly into said slot and shearing said thinned wall along said shear lines and further shearing said thinned wall together with said second side wall thickness longitudinally whereby the locking tab engages the longitudinal slot to lock the box and pin together against relative rotation.

7. The connector as claimed in claim 6 wherein said shear pattern includes a first vertical shear line which extends transverse said thinned wall and said second wall thickness, a first horizontal shear line connected to said first vertical shear line juxtaposed one of said peripheral shear lines, a second horizontal shear line spaced from said first horizontal shear line and juxtaposed the other of said peripheral shear lines but shorter than said first horizontal shear line, and a third shear line connecting said first and second horizontal shear lines and oriented vertically.

8. The connector as claimed in claim 7 wherein thinned wall and said second side wall thickness are bent progressively from the said third vertical shear line to the first vertical shear line.

9. The connector as claimed in claim 8 wherein the depth of the bend of said thinned wall and second side wall thickness varies progressively more from said third vertical shear line to the first vertical shear line.

* * * * *